United States Patent [19]
Barrett

[11] Patent Number: 4,901,899
[45] Date of Patent: Feb. 20, 1990

[54] UNIVERSAL EQUIPMENT CARRIER

[76] Inventor: Garret D. Barrett, 42450 Garfield, Mt. Clemens, Mich. 48044

[21] Appl. No.: 203,713

[22] Filed: Jun. 7, 1988

[51] Int. Cl.⁴ .......................... A01K 97/04; A45F 5/00
[52] U.S. Cl. .................................. 224/223; 224/920; 206/315.11; 383/37; 383/39; 294/143; 294/146; 43/54.1
[58] Field of Search ........ 224/223, 920, 228, 235–237, 224/239, 240; 206/315.1, 315.11; 383/37–39, 32, 40, 66; 294/143, 146, 159; 43/54.1, 57.1; 150/52 R, 52 C, 106; 190/108–111

[56] References Cited

U.S. PATENT DOCUMENTS

| | | | |
|---|---|---|---|
| 2,717,391 | 9/1955 | Bracken | 224/920 |
| 2,832,389 | 4/1958 | Smith | 383/39 |
| 3,029,852 | 4/1962 | Taylor | 383/39 |
| 3,116,773 | 1/1964 | Kikas | 383/22 |
| 3,120,297 | 2/1964 | Riley | 190/110 |
| 3,122,225 | 2/1964 | Ward | 383/37 |
| 3,181,751 | 5/1965 | Wilson | 383/39 |
| 4,236,657 | 12/1980 | Brunton | 224/237 |
| 4,580,667 | 4/1986 | Herwood | 190/110 |
| 4,779,655 | 10/1988 | Olson | 224/240 |

Primary Examiner—Henry J. Recla
Assistant Examiner—J. Casimer Jacyna
Attorney, Agent, or Firm—Harness, Dickey & Pierce

[57] ABSTRACT

A customizeable, foldable equipment carrier with replaceable equipment carrier portions. The equipment carrier includes a first carrier and a second carrier. The second carrier is adapted for removable attachment to the first carrier. A plurality of pouches are provided on each of the carriers. The pouches are formed with parallel sides and a crimped lower seam such that they "puff" out to produce a voluminous storage pouch for storing of equipment therein. The equipment carrier may be customized by removal and replacement of the second carrier with a new carrier containing different tackle or equipment or a carrier having different pocket configurations.

1 Claim, 4 Drawing Sheets

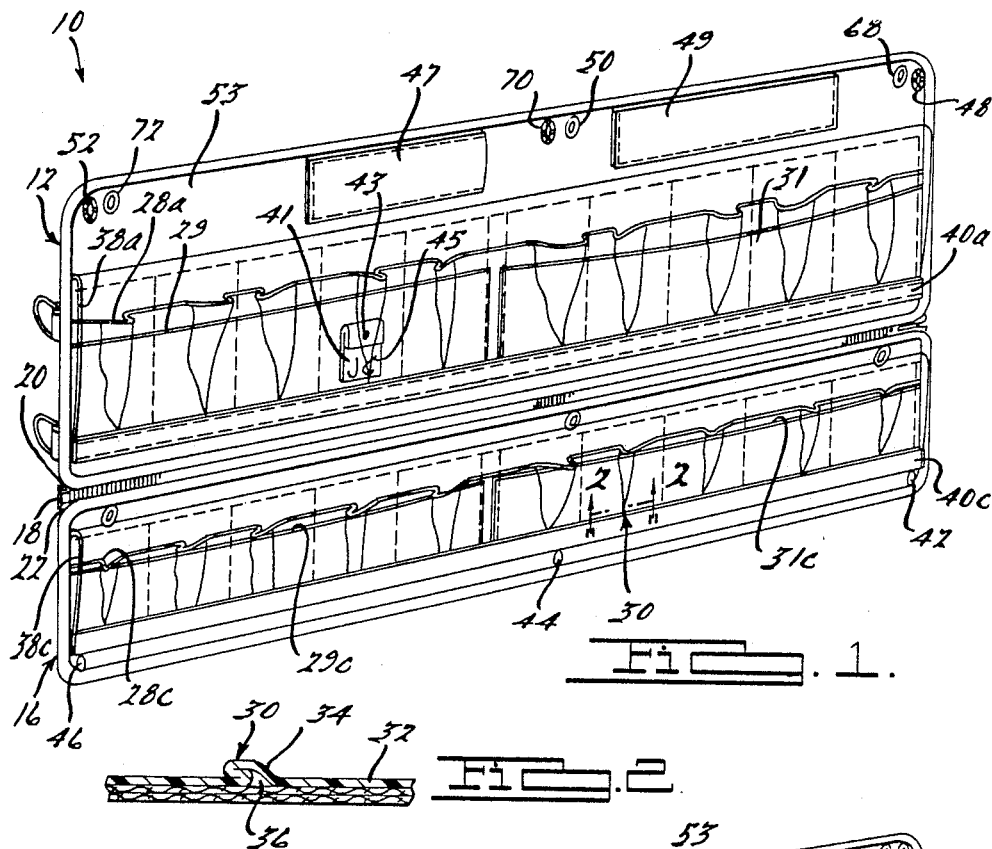
FIG. 1.
FIG. 2.
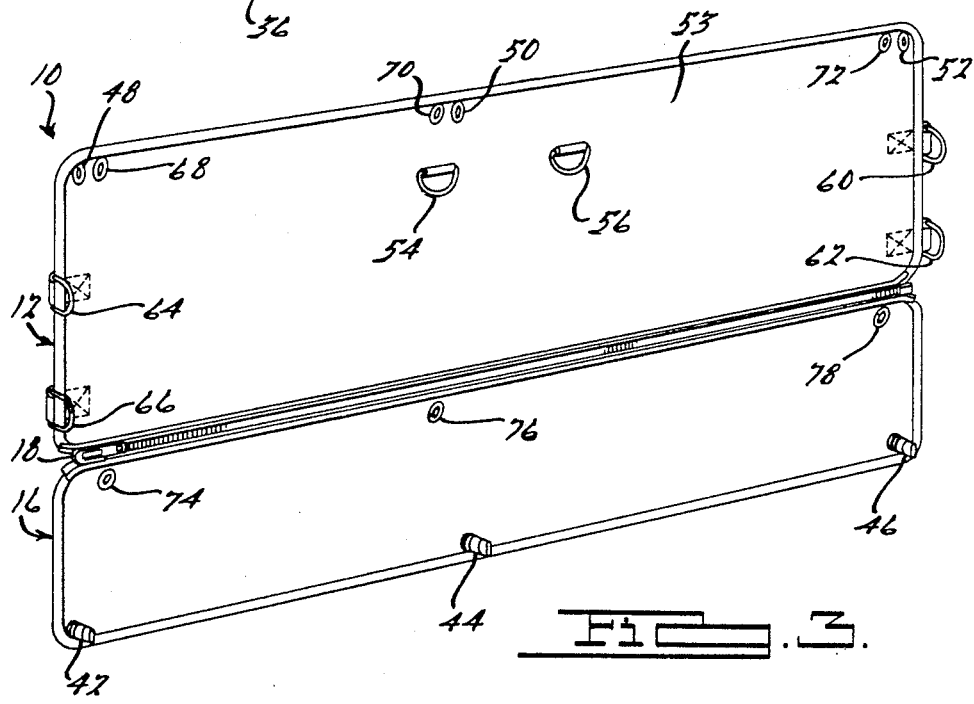
FIG. 3.

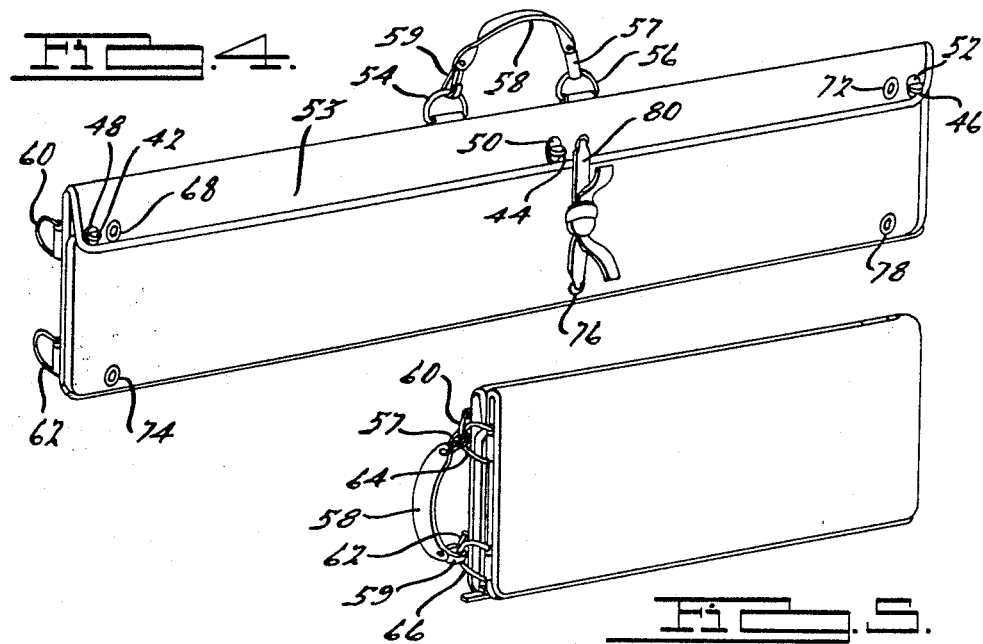
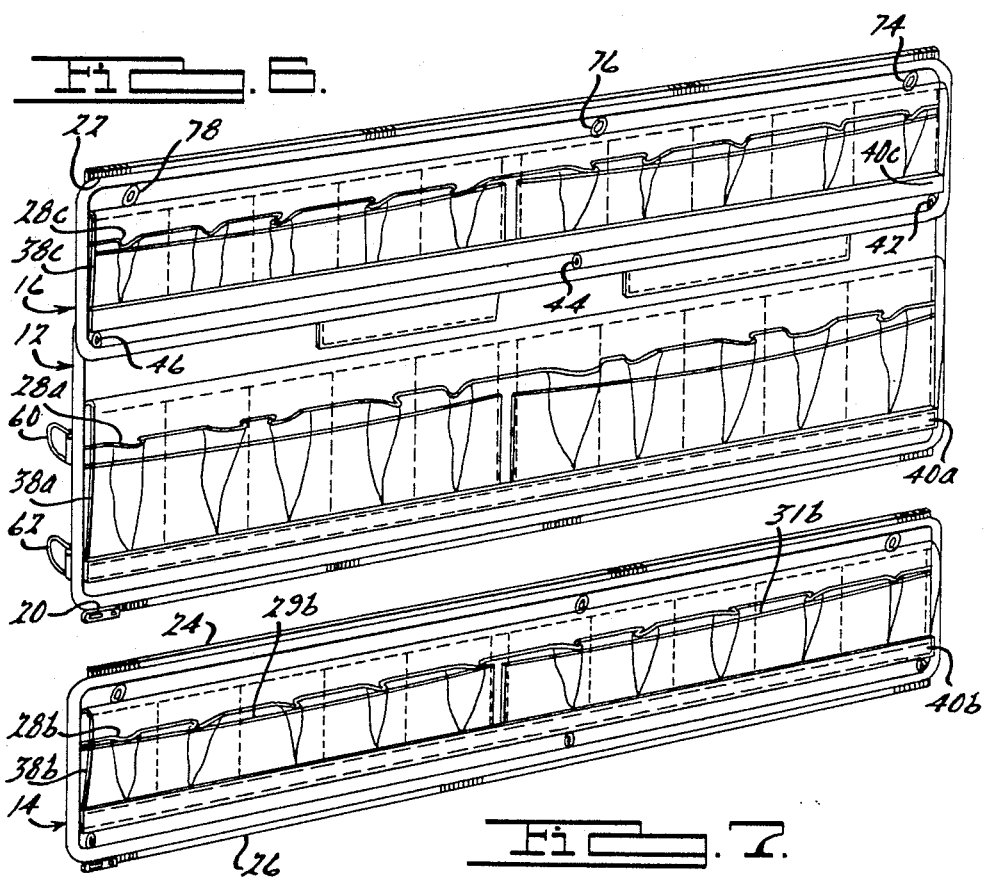

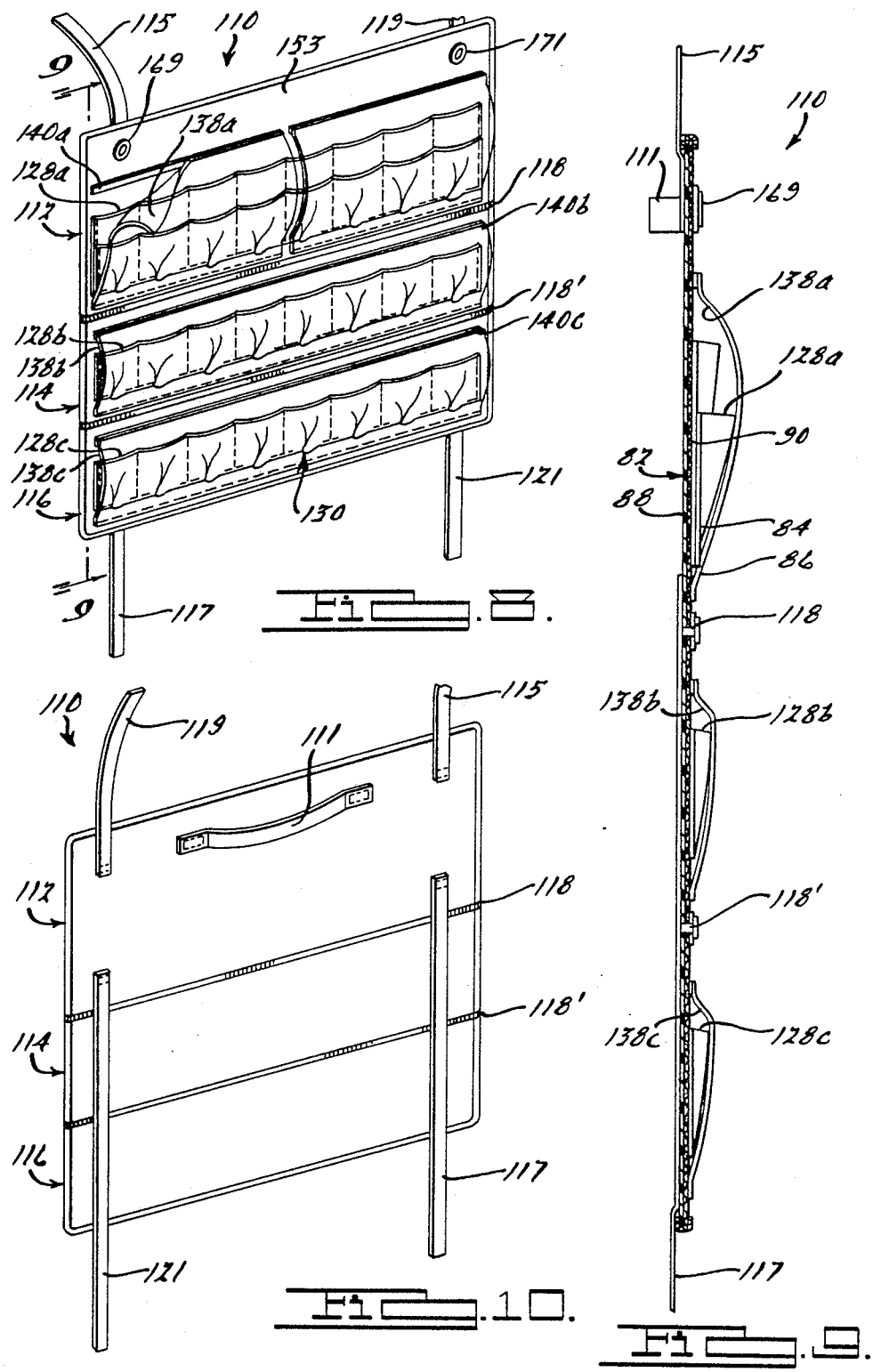

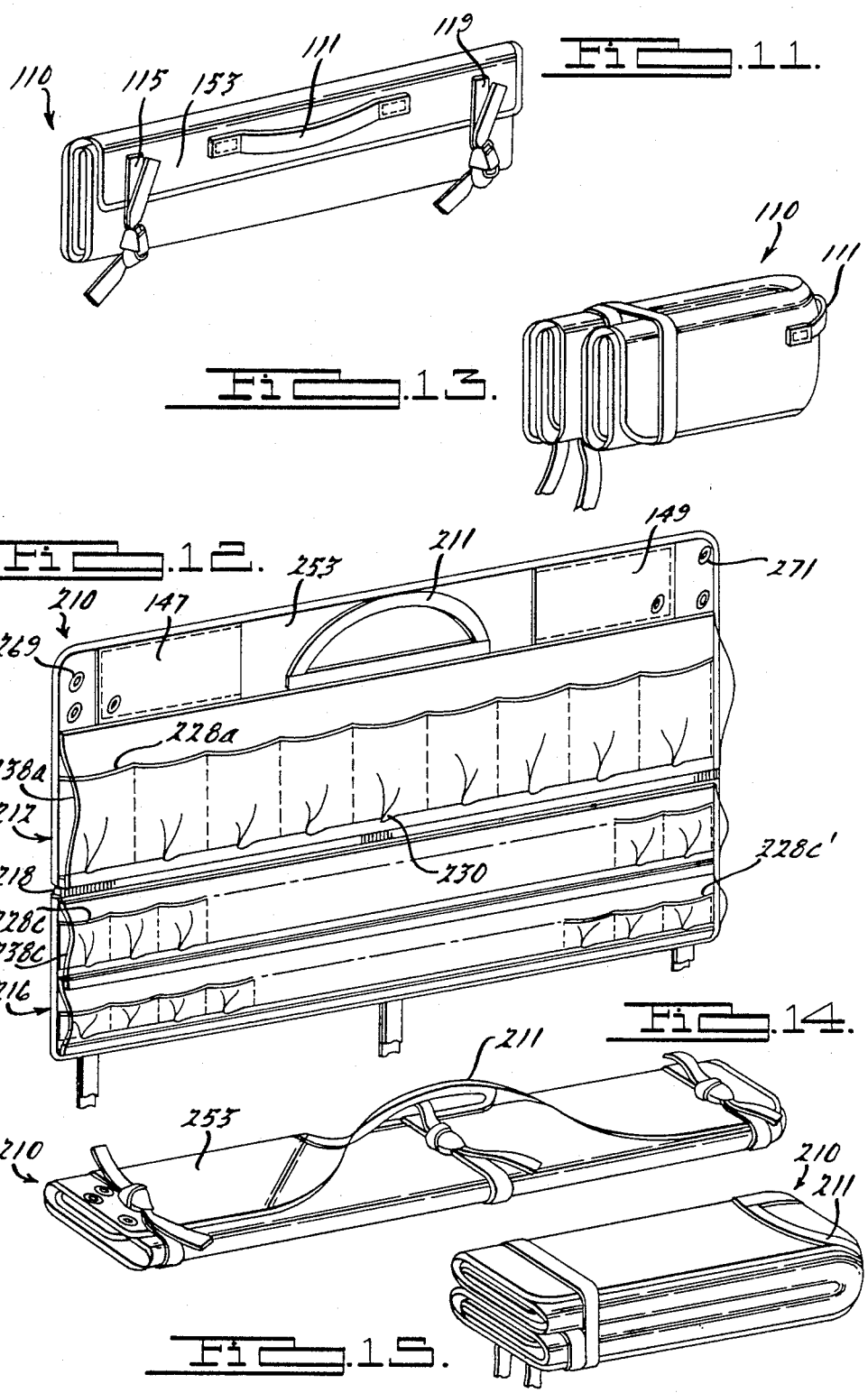

UNIVERSAL EQUIPMENT CARRIER

The present invention relates to a soft equipment carrier. More particularly the present invention relates to a self-contained customizeable foldable equipment carrier.

BACKGROUND OF THE INVENTION

Industries and hobbies such as dentistry, sewing, electronics and fishing require various equipment which must be stored and sorted for convenient transportation and use of the equipment. These and other industries and hobbies have often found it helpful to use storage boxes, tool boxes and the like in organization and transportation of the various tools and equipment.

For example, fishing tackle has commonly been stored for use in fishing tackle boxes and the like. The majority of boxes are styled such that they may contain all of the fisherman's various fishing tackle and equipment in one box. Other "tackle box" configurations have been produced wherein tackle and equipment for particular purposes or a particular species of fish is contained in a separate container for each type of lure and/or species of fish. These types of boxes are referred to as specialty boxes and include those designed to carry only spinner baits, or only plastic worms or only jig and pig type lures. The majority of hard type boxes have trays which slide out or fold out to display or access tackle or equipment which were contained inside of the fishing box for storage. Thus, in the past the fisherman had the choice of buying a large tackle box to hold all of his tackle or buy a series of the specialty tackle boxes to store fishing lures used for each particular fish species or type of fishing he would be doing.

Invariably these prior boxes would not entirely meet a fisherman's needs. Thus, the fisherman is in the continual process of rearranging and replacing tackle in his tackle box for purposes of customizing his box for a particular purpose.

In order to accomplish this customization the fisherman would either have to replace the tackle already in his box and store tackle which he did not want in a separate location or he could use separate boxes which contain different sets of lures or equipment. Since many lures may be effective in fishing for different species of fish there is invariably some type of customizing or changing of lures taking place whether he chooses the specialty box or the larger tackle box. This requires the necessity of external storage for the lures which are not in use or the inconvenience of using an extremely large tackle box which can carry all the fisherman's tackle. Such a large box will carry all the tackle rather than only tackle which is to be used on a particular expedition causing inefficiency in size, weight and lure selection.

Therefore, it is a goal to provide an easily customizeable equipment carrier which can be readily adapted according to a particular need.

Space is at a premium in any boat and particularly in some of the smaller fishing boats used by sport fishermen today. A large size tackle box is inconvenient and undesirable. Likewise, a series of smaller boxes also takes up much space in a boat and is cumbersome for loading and unloading. The use of a large tackle box also requires the fisherman to search through his box to find a particular lure since the lures are not readily visible at the same time in conventional tackle boxes.

Additionally, some of these hard type tackle boxes also require a large amount of space to unfold into in order to access the most remote areas of the box further impinging on the space available. This is of course undesirable in a fishing situation. Also, such hard type boxes are not easily packed in luggage or carried during travel such as when the fisherman is going on a fishing trip to a remote location, traveling by airway or otherwise traveling. Hard type tackle boxes are also troublesome during travel since the upsetting or overturning of such a tackle box will generally create an immense tangle of lures inside of the box.

Tackle boxes of the past have attempted to provide some customizing by means of interchangeable drawers and/or smaller separate boxes which can be placed within the tackle box. The disadvantage of their large size and the inconvenience in selection and display of lures is undesirable in use in a fishing situation. Especially when considering that today fisherman tends to travel to get to remote fishing spots in order to get the best fishing possible. Also, the present day fishing tournaments require professional fishermen to travel thereto and thus pack their gear or otherwise ship their gear to the new fishing spot.

In order to remedy these apparent disadvantages in hard tackle boxes, soft type "tackle boxes" have become increasingly popular. Some developments in the soft tackle storage art are illustrated in U.S. Pat. No. 4,372,073 issued to Sidney M. Goldman and U.S. Pat. No. 4,691,469 issued to Laurance C. Alsobrok, et al. The fishing tackle management system of Alsobrook, et al. has a system of smaller tackle holding containers which are designed to carry specialty types of baits such as crank baits or plastic worms and which containers are packed into a master container in order to hold the complete tackle collection of a fisherman. This system attempts to replace the large style tackle boxes of the past in that it is designed to store all of a fisherman's tackle in one master container. While this tackle management system allows ease of packability for travel the lures are again hidden in smaller containers inside of the master container. This requires that the master container be opened up, the smaller container located and unloaded, and then the smaller container may be opened up to locate and access any particular lure. Thus, the disadvantage of the hard tackle system is inherent in this system also in that the baits are not displayed in one easily identifiable and accessible place wherein the fisherman can easily find the proper bait without searching through a series of hidden containers. In addition, the fishing tackle management system of Alsobrook, et al. requires boat space for storage of the master bag and also requires additional space in which to lay out the smaller tackle pouches in order to access his lures. Because of this, the Alsobrook system also has the disadvantage of requiring some space for spreading the components out.

The tackle storage apparatus of Goldman has a foam back layer which displays all of the fisherman's tackle at once, however, the lures are only carried by hooks which are stuck into the foam pad and therefore, may be shaken loose or may become tangled with one another during fishing or storage creating greater inconvenience and possible lossage of tackle for the fisherman. In addition, the fishing tackle storage apparatus of Goldman also seeks to replace the hard box type system in that side pocket members are provided for packing larger items than just the fishing lures and terminal tackle of the fisherman. Therefore, this apparatus requires a complicated packing and unpacking to prepare the apparatus for storage and carrying after each trip or each access to the fishing lures inside.

A further disadvantage of some "soft type" tackle boxes is that they may be less durable than the hard boxes particularly in colder weather where the construction materials may crack or otherwise deteriorate from being exposed to the elements or due to strenuous usage. Also, the lures in these "soft type" tackle boxes are generally sealed within plastic pouches which may result in more rapid deterioration and/or oxidation of the fishing lures or hooks inside because there may be a lack of adequate ventilation or drainage. Additionally, the tackle management system of Alsobrook, et al. requires overlapping lure containing pockets which tend to wear on each other causing deterioration which is undesirable and requires replacement of these parts as they become worn out.

Therefore, while the above apparatuses have attempted to replace the hard type tackle boxes of the past they have retained some of the disadvantages of box type tackle holders.

Therefore, it is an object of the present invention to provide a self-contained customizeable foldable equipment carrier which solves the above problems apparent in hard and soft tackle boxes.

It is a further object of the present invention to provide an equipment carrier which allows easy visibility and access to all lures or equipment contained in the holder at one time thereby facilitating easy access and removal of the lures for use.

It is a further object of the present invention to provide a customizeable self-contained equipment carrier which allows easy replacement of self contained equipment carriers such that specific tackle or equipment may be stored and contained in the self contained carrier and selectively added, substituted, removed or replaced to provide customization of the equipment carrier without undue time consuming single replacement and/or individual replacement of lures or equipment.

It is still further an object of the present invention to provide an equipment carrier which will save space in that it does not necessarily have to be stored on the floor or other horizontal surfaces but may be opened and hung vertically on a surface such as the gunwale of a boat during fishing and then folded for packing or transportation thereby creating greater flexibility.

It is a further object of the present invention to provide an equipment carrier which is durable for withstanding the rigors of fishing at substantially all temperatures and climates and which will not have inherent design problems which would cause untimely deterioration of the equipment carrier.

It is a further object of the present invention to provide a soft type fishing tackle holder which reduces oxidization and moisture damages to lures or equipment stored therein by providing suitable drainage and ventilation in the tackle holding pockets and/or using materials which are breathable.

It is a further object of the present invention to provide a customizeable equipment carrier which may be readily adapted for us in storing and transporting many products in many different areas of use.

SUMMARY OF THE INVENTION

The above objects are in accordance with the present invention wherein a self-contained customizeable foldable equipment carrier is provided. The equipment carrier of the present invention comprises a first carrier having a plurality of equipment holding pockets. The first carrier also has a connection portion at a first end. Portions of the first carrier define an integral carrying handle for carrying of the main carrier. A secondary carrier is provided which is adapted for removable attachment to the main carrier along the connection portion. The carrier has a plurality of tackle holding pockets defined therein. A first connection means is provided on the main carrier. A second connection means is provided on said second carrier for providing a secure releasable attachment between the first carrier and the secondary carrier. The equipment carrier is foldable about said first and second connection means. Thus, the equipment carrier of the present invention may be customized by removing the secondary carrier and replacing the insert with a different carrier having a particular pocket arrangement. Thus, in the present invention the secondary carrier can be removed with its fishing tackle or equipment in tact for storage and a separate carrier which has different pocket configurations or contains different tackle or equipment may be reattached to the carrier for customizing to the immediate needs of the user.

With the equipment carrier of the present invention a fisherman may store some tackle or equipment in a carrier while using a separate carrier with the first carrier to fish for a certain species of fish or for a particular use and then the user may easily replace the carrier for another carrier containing a different type of equipment for a different type of use while using the same main carrier. The equipment carrier of the present invention may be advantageously folded to generally a flat configuration and placed on the gunnel of a boat for convenient storage of lures, thus, saving space in the boat, or might be folded into a collapsed configuration for transportation or packing in one's luggage for travel.

DESCRIPTION OF THE DRAWINGS

Other advantages of the present invention will be readily appreciated as the same becomes better understood by reference to the following detailed description when considered in connection with the accompanying drawings wherein:

FIG. 1 is a front perspective view of an equipment carrier made in accordance with the teachings of the present invention;

FIG. 2 is a sectional view taken along line 2—2 showing crimp forming a "puff" pouch of an equipment carrier made in accordance with the teachings of the present invention;

FIG. 3 is a rear perspective view of the equipment carrier of FIG. 1;

FIG. 4 is a perspective view of an equipment carrier of the present invention in the folded configuration;

FIG. 5 is a perspective view of the equipment carrier of the present invention in a further folded configuration;

FIG. 6 is a perspective view of the equipment carrier of FIG. 4 which is opened along the zipper thereof;

FIG. 7 is a perspective view of a carrier pack which is insertable for customizing and expanding the equipment carrier of the present invention;

FIG. 8 is a perspective view of an alternate embodiment of an equipment carrier made in accordance with the teachings of the present invention;

FIG. 9 is a cross-sectional view of the equipment carrier taken along the lines 2—2 of FIG. 1;

FIG. 10 is a rear view of the equipment carrier of the present invention;

FIG. 11 is a perspective view of the equipment carrier shown folded in its storage position;

FIG. 12 is a perspective view of the equipment carrier showing it in a further folded configuration provided for easier packing and storage of same;

FIG. 13 is a perspective view of an alternate embodiment of the equipment carrier made in accordance with the teachings of the present invention;

FIG. 14 is a perspective view showing the equipment carrier of FIG. 13 folded into its storage configuration; and FIG. 15 is a perspective view showing the equipment carrier of FIG. 14 further folded in one half for convenience storage or transportation of the fishing tackle holder.

DETAILED DESCRIPTION OF THE INVENTION

According to the present invention there is provided a self-contained customizeable foldable equipment carrier 10. The equipment carrier 10 includes a first master carrier pack 12, a second intermediate carrier pack 14 (as shown in FIG. 6), and a terminal carrier pack 16. As shown in FIG. 1, the carrier 12 and the terminal carrier 16 are releasably connected by zipper 18. As shown in FIG. 1, the carrier 12 has a zipper portion 20 at its lower end and the carrier 16 has a zipper portion 22 at its upper end. The carrier 14 includes the zippers 24 and 26 at both ends thereof.

Each of the carrier packs 12, 14 and 16 include a plurality of "puff" pouches 28a, 28b and 28c respectfully configured in side by side arrangement. These pouches are referred to as "puff" pouches because of the unique configuration of the pouches as formed by attachment to the carriers. Each of these pouches includes at its lower portion respectfully, a crimp over-lapped portion 30 (shown in detail in FIG. 1) for formation of a pouch which puffs out at its upper end. This novel configuration results in a substantial increase in the amount of usable carrying space inside of each of these pouches which has commonly been a problem in the past type of carriers and is a desirable feature.

Outer pockets 29a, 31a; 29b, 31b; and 29c, 31c are also provided for storage of elongated equipment if the need arises. These pockets also form a protective layer for protecting the "puff" pouches from abrasion.

As shown in detail in FIG. 2, the representative crimp comprises a sheet 32 of the pouch forming material being folded upon itself and sewn together at the base of the pouch to form a crimped portion 34. This configuration also advantageously results in a small opening 36 at the base of each pouch. The sides of the pouches are then sewn in a parallel manner by stitches to provide the configuration as shown in the figures. The opening 34 advantageously provides a drainage for each of the pouches which allows any wet implements being stored in the pouches to advantageously drain. This helps protect the equipment being placed in the pouches from exposure to moisture and the like and provides drainage and ventilation to each of the pouches. While not shown, it is readily appreciated that if the pouch forming sheet of each pouch were extended, its width would be greater than the distance between the side seams.

Each of the carriers has a cover portion 38a, 38b and 38c which is adapted to fold over and protect the equipments contained in the pouches. Velcro closures 40a, 40b and 40c are provided for advantageously removably securing the cover portions over the pouches.

A separate pocket 41, having a snap closure 43, may be used with the present invention for storing small items such a fish hooks 45 and the like. Pockets 47 and 49 may be provided in various configurations depending on the use of the equipment carrier such as for storing fishing pliers and the like.

Twist fasteners 42, 44 and 46 are provided on the lower carrier which can engage cooperating orifices 48, 50 and 52 respectfully are provided on the flap 54 of the upper carrier 12 for operatively engaging the twist fasteners 42, 44 and 46.

Referring now to FIG. 4, the zipper 18 operates as a hinge by which the lower carrier 16 may be folded upward. The flap 53 may be folded downward thereafter such that the twist fasteners engage the orifices to secure the carrier in a closed position.

"D" rings 54 and 56 are provided on the back portion of the carrier 12 such that handle 58 may be attached upon closing of the carrier in order for advantageous carrying when in the closed position. Handle 58 has spring clips 57 and 59 for releasably engaging the "D" rings for carrying of the equipment carrier.

"D" rings 60, 62, 64 and 66 are also provided on the sides of the upper carrier portion 12. These "D" rings are advantageous when it is desired that the carrier be folded in a more compact position, as shown in FIG. 5, wherein the handle 58 engages all four "D" rings in order to thereby secure the equipment carrier in the more compact folded position.

Alternatively, grommets 68, 70, 72, 74, 76 and 78 are provided in the carrier portions through which a strap 80 may be advantageously threaded. While use of a strap is normally not necessary in certain circumstances use of a strap may be advantageous. For instance, if the equipment carrier is carrying too much equipment, for using the twist fastener's straps may be threaded through the grommets in like manner to secure the carrier in the closed position. Also, straps could be used as a backup fastening measure, for instance, on long trips and the like to ensure secure closure of the carrier.

The configuration of the present invention allows ready access to equipment contained therein by either opening the twist fasteners 42, 44, 46 and thereby opening the equipment carrier. Or, in the alternative as shown in FIG. 6, the zipper 18 connecting the carriers 12 and 16 may be advantageously opened in order to access the contents therein.

The carrier 14 is designed to advantageously be attached between the carrier 16 and the carrier 12 to provide for customizeability of the carrier. Thus, one or several of the carriers 14 may be attached between the carriers 12 and 16. This can be accomplished either by opening the equipment carrier, as showing in FIG. 6, and thereafter attaching as many of the carriers 14 as are deemed necessary, or the equipment carrier can be opened, as shown in FIG. 1, and the zipper 18 unzipped and thereafter one or several of the carriers portions 14 may be inserted therebetween.

Referring now to FIG. 9, preferably, the carriers are of like construction including a backing fabric material 82, a pocket forming sheet material 84 and a cover portion 86. The backing fabric 82 of the invention is preferably made of a two ply construction which has an outer layer 88 made of vinyl, canvas, nylon, or a copolymer or polymeric material and has an inner layer 90 which is made of like material of a lesser weight. These layers are sewn together to provide a backing layer which has proven characteristics for wear resistance, durability, tear resistance, seam strength, color fastness, stain resistance, water resistance and low maintenance/easy cleaning. The material chosen is also preferably mildew resistant, resistant to sunlight and harsh climates and is readily flexible in cold weather.

The pocket forming sheet 84 and cover portion 86 is preferably made from a clear acrylic material. The acrylic material is preferably a 12 to 20 grade thickness of clear poly-vinyl acrylic. Micropore materials may also be used. These materials will promote breathability and moisture evaporation from the internal areas of the pouches 28a, 28b, and 28c. The use of a micropore material helps to prevent oxidation of the contents of the tackle holder and damaging moisture build up inside of the pockets which may occur such as when a damp lure is placed therein.

The pouches 28a, 28b and 28c are formed by attaching the backing sheet together with the pocket forming sheet such that two sides of each of the pockets are sewn vertically parallel and a seam is provided forming the bottom of the pocket which is sewn together to provide a crimp 33 therein. This pocket construction is unique in that it forms a pouch type pocket which will allow the placement of bulky equipment such as several of lures at a time in each pouch of the pocket. The crimp portion also serves to provide drainage from the pockets for wet lures and the like and provides ventilation to the pocket.

Referring now to FIGS. 8 through 12, an alternate embodiment 100 of a self-contained customizeable foldable equipment carrier made in accordance with the teachings of the present invention is shown. In the drawings like elements are represented by like numbers differing by one hundred. The equipment carrier 100 includes a first master equipment carrier pak member 112. Portions of the carrier define an integral carrying handle 111 for carrying of the tackle holder when in a folded position.

An intermediate carrier pak member 114 is provided which is adapted for removable attachment to first carrier. A first zipper 118 is provided at the lower end of the first carrier 112. A corresponding and cooperating second connection means is provided on the intermediate carrier 114 which provides for secure releasable attachment between intermediate carrier 114 and first carrier 112. Straps 115, 117, 119 and 121 are provided whereby the tackle holder can be secured in the folded configuration. Thus, the equipment carrier may be customized by removing the second carrier 114 and replacing it with a different carrier which has a different pocket configuration or for providing a different folding configuration for storage. Similarly, terminal carrier 116 could also be replaced if desired.

The cover portions 138a, 138b, and 138c may be attached at the base of the horizontal row of pockets as shown in FIGS. 8 and 9 and is removably secured when covering the pockets by a Velcro® attachment, Velcore ™, Velstick or like types of fasteners which provide for secure releasable fastening of the flaps. It has been found that while Velcro, hook and fabric type fasteners, are operable, fasteners such as Velcore which uses mushroom and ball type fasteners or alternatively Velstick fastening strips may be preferable for certain uses where the carrier may be exposed to sand or dirt since the latter type fastening systems do not retain the grit as readily and are more easily washable. In the alternative as shown in FIG. 13 the cover portions 238a, 238b and 238c may be attached to the top of the pockets and folded over the openings of the pockets to be removably secured at the base of the pockets by Velcro or Velcore attachment or the like.

To facilitate easier access to the contents of the pouches the covers may be cut in a vertical direction, such as shown in FIG. 8, to form covers 138a and 138b, which may be separately opened for access to only one side or the other of the equipment containing pouches.

Thus, the covers 138a and 138b enclose the pockets for protecting the lures from the elements and/or protecting the user from the hooks or other protrusions of the lures or equipment carried therein. Since the acrylic used for the insert is of a clear consistency, all the lures are in view when the fishing tackle holder of the present invention is laid out in its open unfolded configuration thereby providing the fisherman a quick view of all the lures or equipment available to him for use and an easy accessibility to the lures simply by releasing the cover portion from its attachment at either the upper or lower end folding it back and removing the desired lure from the pocket.

The intermediate carriers 14, 114 and 214 may have configurations varying on the usage of the equipment carrier. For instance, if the fisherman is strictly fishing for northern pike or muskellonge which requires a series of larger size lures, all of the pockets 28 will be configured in such a way that they will be longer and wider for accommodating these larger types of lures generally used for these species. Thus, several of these inserts will be provided having varying pocket configurations to accommodate various types of lures and/or fishing tackle which may be desirable for particular situations. As shown in FIG. 1, a preferred embodiment of the present invention comprises three vertical rows of horizontally spaced pockets. All having the crimped pocket configuration, such that a plurality of lures may be placed in each, increasing the total storage capacity of the equipment carrier.

The carriers may also have more than one row of pouches. As shown in FIG. 14, the terminal carrier 216 has two rows of pouches 228c and 228c' which could advantageously be used to carry various smaller type items. Alternatively, the pouches could be arranged such that the pouches overlap one another as shown in FIGS. 8 and 9.

This configuration allows the fisherman to utilize the same master carrier for all his fishing while allowing customization through replacement of customized intermediate and terminal carriers which are relatively inexpensive and which can be pre-stocked with the fisherman's selection of lures for each specific purpose.

Each of the carriers is a self-contained carrier unit. Storage of fishing tackle is therefore provided whether the carrier is attached to the fishing tackle holder or is separated from the fishing tackle holder and replaced by a separate carrier. Thus, with such a configuration each of the separate carriers can be individually and separately removed and/or replaced in the master carrier 12, 112, and 212 to provide a customized fishing tackle holder. These individual carriers have the further advantage in that upon removal of the carrier they become a self-contained storage unit in which to store the fishing tackle until it is further used.

Thus, the carrier can be customized by selectively adding, removing and/or replacing intermediate carriers 14, 114 and/or terminal carriers 16, 116 and 216 with another carrier and substituting or adding a carrier member having different fishing tackle or other implements therein for each particular fishing situation.

Referring now to FIGS. 13–15, the handle 211 is integral with the carrier 212. As shown in FIG. 14 the unit may be advantageously folded along the zippers into a smaller size for ease of storage, packaging and transportation of the unit. This configuration will thereby give it a smaller size which can be easily packed in someone's luggage and will not take much space in a boat.

A set of two or three straps are provided which are attached to the back of the cover and will thereby wind around and tie to hold the fishing tackle holder in the folded position. The unit is advantageously arranged such that it can be again folded in half and secured in order to give an even smaller arrangement for packaging and storing fishing tackle or for packing it in smaller luggage or the like. As shown in FIG. 14 the configuration of FIG. 13 is folded up thereby providing the convenient handle 211 which can be used to carry the equipment carrier in this folded configuration. As shown in FIG. 15, this configuration can be further folded in half to provide an even more compact fishing tackle holder for storage or transportation.

Grommets 269, 271 of FIG. 14; 169, 171 of FIG. 8 or 68, 70, 72 of FIG. 3 may be used in combination with "S" type hooks to allow the fishing tackle holder of the present invention to be advantageously hung generally vertically on the gunnel of a boat or other vertical surface whereby the full equipment contained by the equipment carrier of the present invention may be easily viewed and accessed by the fisherman. Similarly, any of the intermediate carriers which have similar grommets (such as grommets 74, 76, and 78 of carrier 16) could be advantageously removed from the master carrier 12 and be positioned and hung in a verticle position in the most useful place in the boat for example.

This configuration allows the fishing tackle holder of the present invention to be space saving in that it is not necessary to take up any of the floor space unlike the various tackle bags or tackle boxes and therefore the space can then otherwise be used for mobility and comfort of the passengers of the boat. Additionally, when the equipment carrier is folded up, the covers protect fishing lures and pockets themselves from being worn or otherwise deteriorated due to friction between them in the folded up state.

Thus, in the configuration of the present invention the user can customize his equipment carrier to his own needs. For instance, in a fishing application certain baits may be useful or interchangeable for fishing of various types of species whereas certain other baits may be only useful or mainly particularly directed to a particular species of fish. Thus, the present invention could be customized by leaving these universal baits in a particular tackle carrier while having a series of pre-packed tackle carriers which can be interchanged for customizing his tackle for use with particular species of fish that the fisherman may be fishing on a particular day.

For example, it is known that "crank bait" type lures may be useful in fishing for bass, walleye, northern pike and in certain instances many of the salmonoid species. Whereas "plastic worms" or "jig and pig" type lures are more particularly suited for bass fishing and are not interchangeable for various species in the manner that the crank baits would be. Thus, when bass fishing as opposed to salmon fishing a particular carrier which has lures such as "J" plugs and the like which are mainly suitable for salmon fishing could be replaced with a carrier which is prepacked with "plastic worms" and "jig and pig" lures which are mainly suitable for bass fishing. Thereby leaving the crank bait type lures in the tackle holder and replacing the carrier containing the salmon lures with a more a particularized bass lure carrier. The advantageous combination of the present invention allows the carrier containing the salmon lures to be placed aside or stored within itself to keep the lures clean and safe until the next salmon fishing trip may take place. While this is given as a particular example, those skilled in the art will readily appreciate the advantages and usefulness of such a customizeable configuration in a tackle holder. With the configuration of the present invention a fisherman may come up with his own customized tackle container which is suitable for his own particular needs or the type of fishing technique he is planning o using on a particular day. Thus, the present invention provides the user, such as a fisherman, with a streamlined way to customize his tackle as he feels necessary.

Additionally, this tackle holder allows easy access and full sight of all lures or equipment which is contained therein. It is unlike the prior tackle boxes which required either folding out thereby encumbering the space of the boat or by searching through drawers or even in some of the soft tackle boxes of the past by searching through the master pack to provide the particular sub-pack necessary which then have to be open to access the lures. Thus, the fisherman can easily locate and change his lures without taking up space in the boat and without unduly cumbersome fumbling with separate packs.

While the present invention has been primarily described as a fishing tackle holder, it will be appreciated by those skilled in the art that the present invention would be equally advantageous in organizing various tools or items in other uses. For example, it is believed that the subject invention could be customized for uses such as storing and carrying tools, sewing implements, dental instruments, medical and electrical tools, and the like without deviating from the scope of the present invention.

While the above description constitutes the preferred embodiment of the present invention, it will be appreciated that the invention is as acceptable to modification, variation and change without departing from the proper scope and fair meaning of the accompanying claims.

What is claimed is:

1. A customizeable foldable fishing tackle carrier having selectively replaceable carrier portions comprising:
   a first carrier including atop edge, two side edges, a lower terminal edge, a backing side and a pocket forming side, means on said first carrier adaptable for attaching a handle for carrying of said fishing tackle carrier, a first zipper portion on a lower terminal edge of said first carrier for cooperation with a zipper portion on a separate carrier, said means on said first carrier including a pair of spaced 'd' rings on each of the side edges thereof and a single pair of spaced "d" rings centrally located on the backing side;

at least one intermediate carrier, said intermediate carrier including, a second and third cooperating zipper portion on upper and lower edges of said intermediate carrier respectively, said second zipper portion cooperating with said first zipper portion on said first carrier to provide for releasable attachment thereto; and a terminal carrier having a fourth zipper portion along its upper end for cooperating with said third zipper portion or with said first zipper portion to provide for releasable attachment to either said first carrier or one of said intermediate carriers;

each of said carriers including at least one row of horizontally disposed pouches, each of said pouches including a bottom crimped seam wherein the pouch forming sheet is folded upon itself and a pair of opposed parallel side seams whereby a voluminous pouch is formed thereon, said bottom crimped seam including a portion thereof defining a drain opening for drainage and ventilation of each of said pouches;

a pouch cover securable over the open ends of said pouches for simultaneously covering all of the pouch openings and the pouches themselves in a horizontal row of said pouches, said pouch cover and said pouches being formed from a substantially transparent micropore material for allowing visual recognition of lures contained in said pouches and said micropore material allowing for breathing of fishing tackle contained in said pouches for preventing oxidation thereof; and a handle removably attached to at least one pair of "d" rings; said fishing tackle carrier being foldable along the zippers for storage in a first folded position and having a means for securing said fishing tackle carrier in said first folded position, wherein said handle may be attached to said centrally located pair of "d" rings for temporarily carrying said fishing tackle carrier in the first folded position, said carrier being foldable along a central vertical line wherein said pairs of "d" rings on said sides of said first carrier are adjacent to one another such that said handle may be attached to secure said pairs of "d" rings together for securing the fishing tackle carrier in a second more compactly folded position for carrying thereof.

* * * * *

UNITED STATES PATENT AND TRADEMARK OFFICE
CERTIFICATE OF CORRECTION

PATENT NO. : 4,901,899

DATED : February 20, 1990

INVENTOR(S) : Garret D. Barrett

It is certified that error appears in the above-identified patent and that said Letters Patent is hereby corrected as shown below:

Col. 2, Line 30, "Alsobrok" should be --Alsobrook--;

Col. 3, Line 63, "us" should be --use--;

Col. 6, Line 62, "carriers" should be --carrier--;

Col. 10, Line 22, "o" should be --on--;

Col. 10, Line 57, "atop" should be --a top--; and

Col. 10, Line 65, " 'd' " should be --"d"--.

Signed and Sealed this

Third Day of March, 1992

Attest:

HARRY F. MANBECK, JR.

*Attesting Officer*   *Commissioner of Patents and Trademarks*